Figure 1:
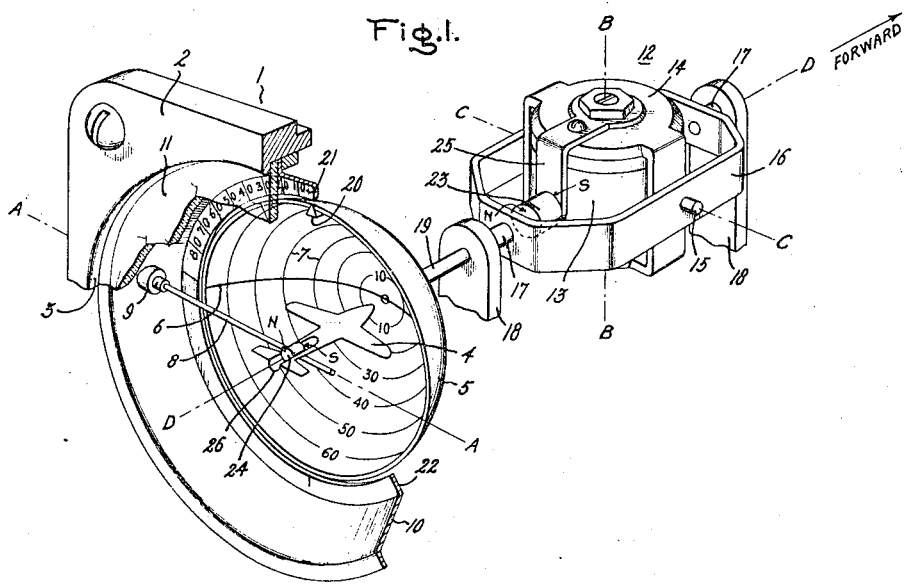

Feb. 11, 1947.　　　C. F. SAVAGE　　　2,415,707
ATTITUDE INDICATOR
Filed March 28, 1945

Inventor:
Charles F. Savage,
by Harry E. Dunham
His Attorney.

Patented Feb. 11, 1947

2,415,707

UNITED STATES PATENT OFFICE 2,415,707

ATTITUDE INDICATOR

Charles F. Savage, Marblehead, Mass., assignor to General Electric Company, a corporation of New York Application March 28, 1945, Serial No. 585,338

2 Claims. (Cl. 33—204)

The present invention relates to aircraft instruments, and more particularly to attitude instruments used to indicate the pitch and bank attitudes of an aircraft in flight.

At the present time gyroscopic attitude indicating instruments known as "artificial horizons" are commonly used on aircraft to indicate the pitch and bank attitudes of the aircraft, such instruments being particularly useful during blind flying operations. The present conventional artificial horizon instrument comprises an indicator, usually in the form of a two-dimensional silhouette of an airplane, which is fixed relative to the instrument case. The attitude of the aircraft is judged by comparing the miniature airplane with the position of a horizon bar which rotates relative to the instrument case when the aircraft banks and which moves vertically relative to the case in response to changes in pitch attitude of the aircraft. In using such an instrument the pilot must assume that the miniature two-dimensional airplane represents his own craft which he flies relative to the moving horizon bar. Due to the fact that the miniature reference airplane is two dimensional, it is sometimes difficult for the pilot to grasp this concept, i. e., that the miniature two-dimensional airplane represents his own aircraft. Furthermore, with these instruments a motion-reversing linkage must be used in coupling the horizon bar to the gyroscope in order to obtain the proper sense of indication. Such a motion-reversing linkage is difficult to manufacture and, if improperly manufactured, is apt to introduce objectionable friction in the gyro gimbal system which causes an undesirable error.

An object of the present invention is to provide a new and improved attitude indicating instrument for aircraft.

Another object of the present invention is to provide an attitude indicating instrument for aircraft having an improved arrangement for indicating pitch and bank attitudes of the aircraft to the pilot.

A further object of the invention is to provide an improved attitude instrument having a simplified and improved arrangement for transmitting motion from the gyroscope or other position-maintaining means to the reference indicator.

Other objects and advantages of the present invention will become apparent as the following description proceeds.

Briefly, according to the present invention, an attitude indicating instrument for aircraft is provided having an indicator in the form of a miniature three-dimensional airplane which moves with reference to a background member in response to pitch and bank movements of the aircraft. In the illustrated embodiment of the invention the background member is in the form of a hollow hemisphere the inner surface of which is marked with an artificial horizon line and other reference lines for gauging pitch attitude. The background member is mechanically connected to a gyroscope so that it rotates relative to the case to give a bank indication. Pitch indication of the reference airplane or indicator is obtained by a novel arrangement comprising a pair of cooperating magnets one of which is mounted upon the miniature airplane and the other is mounted on the gyroscope, the arrangement being such that movements of the instrument case about the pitch axis cause the nose of the miniature airplane to move vertically relative to the background member.

For a better understanding of the present invention reference should now be made to the following detailed description and the accompanying drawing.

Figure 2:
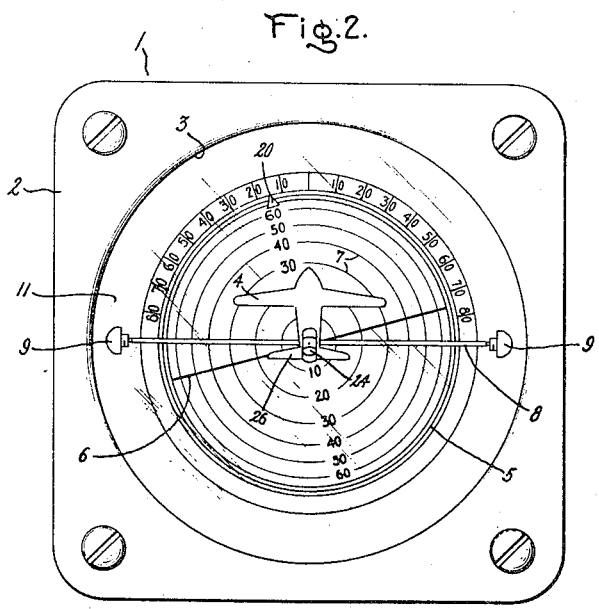

In the drawing Fig. 1 is a perspective view, partly in section, of an attitude indicating instrument embodying the novel attitude indicating arrangement forming the subject matter of the present invention, and Fig. 2 is a front view of the instrument as it appears to the pilot when the aircraft, on which the instrument is mounted, is banking to the right and at the same time is in a climbing attitude.

Referring to the drawing the attitude indicating instrument of the present invention is shown as comprising a case 1 the forward portion of which is shaped to form a rectangular face plate 2 which is adapted to be mounted upon the instrument panel of an aircraft so that the face plate 2 faces rearwardly toward the pilot controlling the flight of the aircraft on which the instrument is mounted. The face plate 2 is provided with a circular window or opening 3 through which attitude indications of the instrument are observed. The attitude of the aircraft is determined by observing the relative positions of a miniature three-dimensional airplane 4 relative to a background member 5. This background member 5 is preferably, as shown in the drawing, in the form of a hollow hemisphere having painted or otherwise marked on its inner surface an artificial horizon line 6 and a series of concentric pitch reference lines 7. The miniature airplane 4 is mounted on a transversely extending shaft 8 so that it projects into the space enclosed by the hollow or concave background member 5, the nose of the miniature airplane lying adjacent the inner surface of the background member. The shaft 8 is journaled in suitable bearings 9 so that the shaft and the miniature airplane are free to pivot about a transversely extending axis AA as shown. The bearings 9 are supported on a frusto-conically shaped flange member 10, the outer surface of which is attached to the face plate 2. Preferably the opening or window 3 in the face plate is covered by a suitable cover glass 11 which acts to protect the moving parts of the instrument.

In accordance with the present invention, bank indications are obtained by rotating the background member 5 relative to the miniature airplane 4 and pitch indications are obtained by pivoting the miniature airplane about the axis AA so that the nose thereof moves vertically relative to the background member. The means by which these relative movements are obtained will now be described.

For the purpose of measuring pitch and bank angular movements of the instrument case about the pitch and bank axes of the aircraft on which the instrument is mounted, there is provided a vertical axis gyroscope or gyro vertical indicated generally at 12. The gyro vertical, which may be of conventional construction, is shown as comprising a rotating mass or rotor 13 which is mounted in a suitable bearing housing or frame 14 so that the spin axis of the gyro rotor extends vertically in the direction of the axis BB. The gyro rotor 13 may be rotated by any suitable electric or pneumatic motor means, the showing of which has been omitted for the sake of clarity. The gyro frame 14 is supported by trunnions, one of which is shown at 15, the trunnions being journaled in a gimbal 16 so that the gyro is free to rotate about the trunnion axis CC which is perpendicular to the gyro spin axis BB. The trunnion axis CC extends transversely of the instrument and is parallel to the pitch axis of the aircraft, and is also parallel to the pivotal axis AA of the miniature airplane 4. The trunnion axis CC may be termed the pitch axis of the gyroscope.

The gimbal 16 is supported by trunnions 17 which are rotatably journaled in relatively fixed supports 18 mounted on the instrument case so that it is free to rotate about an axis DD which is perpendicular to the trunnion axis CC. The trunnion axis DD is parallel to the roll axis of the aircraft and may therefore be termed the roll axis of the gyroscope.

The gimbal supporting system for the gyroscope is a conventional Cardan suspension which permits universal movement of the gyroscope relative to its support and due to the characteristic gyroscopic property of rigidity the spin axis of the gyroscope tends to remain vertical. A conventional pendulous erection system (not shown) may be provided for continuously coercing the spin axis of the gyroscope into a vertical or approximately vertical position.

One of the trunnions 17 on the rear side of the gyroscope 12 is provided with a shaft extension 19 which supports the concave background member 5, the axis of revolution of the background member being coaxial with the shaft 19 and the trunnion axis DD. The background member 5 is thus stabilized with reference to rotation of the instrument case about the roll axis DD. In this manner, relative banking motion is obtained between the miniature airplane 4 and the background member 5, the miniature airplane being constrained by the shaft 8 to rotate about the roll axis with the instrument case. In order to provide additional means for gauging the angle of bank, there is provided a pointer 20 which is attached to the background member 5 to rotate therewith and which is read against a scale 21. The scale 21 may be, as shown, suitably marked or etched on an inwardly projecting flange 22 forming a part of the flange member 10. As viewed in Fig. 2, movement of the pointer to the left-hand quadrant will indicate the degrees of right bank and, similarly, movement of the pointer to the right quadrant will indicate the degrees of left bank.

For the purpose of causing the miniature airplane 4 to pivot about the axis AA and thereby give a pitch indication of the aircraft in the proper sense, there is provided a novel magnetic system for transmitting pitch motion of the gyroscope to the miniature airplane. The magnetic pitch motion-transmitting system comprises a permanent magnet 23 which is attached to the gyro frame 14 and a coacting permanent magnet 24 which is attached to the miniature airplane 4. The permanent magnet 23 is mounted on the gyro frame 14 by a strap 25 and is so arranged that the axis of the magnet extends in the direction of the roll axis DD when the roll axis is level. The permanent magnet 24 is clamped or otherwise secured in a recess 26 in the miniature airplane 4 so that the axis of the magnet extends in the direction of the nose of the miniature airplane and the center of the magnet lies at the point of intersection of the axes AA and DD. The magnet 24 may also be used as a balance weight so that the miniature 3 is approximately balanced with reference to rotation about the axis AA. The magnets 23 and 24 are arranged so that the adjacent poles of the two magnets are of opposite polarity. Therefore, when the instrument is in the level flight position shown in Fig. 1, the nose of the miniature airplane is magnetically held opposite the center point zero of the background member 5, thereby indicating a level flight condition.

Since the permanent magnet 23 is mounted on the frame of the gyroscope, the magnetic flux pattern produced thereby will be stabilized with reference to rotation of the instrument case about the pitch axis CC and due to the orientation of this magnet the axis of the flux pattern will remain horizontal. However, due to the characteristic pattern of the lines of force produced by a magnet, the lines of force in a vertical plane, including the roll axis DD, will curve upwardly above a horizontal plane and will curve downwardly below the horizontal plane. Therefore, if the instrument case is rotated about the pitch axis CC, as in a dive, so that the permanent magnet 24 is moved above the axis of the field of the permanent magnet 23, the magnet 24 in rotating to align itself with the upwardly curving field, will cause the nose of the miniature airplane 4 to be depressed below the horizon line 6, thereby indicating a dive. On the other hand, if the instrument case is rotated in the opposite direction about the pitch axis CC so that the permanent magnet 24 moves below the axis of the permanent magnet 23, as in a climb, the permanent magnet 24, in rotating to align itself with the downwardly curving field, will cause the nose of the miniature airplane 4 to rise above the horizon line 6 thereby indicating climb. The concentric pitch reference lines 7 are calibrated in degrees of "dive" and "climb" so that the dive or climb attitude of the aircraft can be determined by the position of the nose of the miniature aircraft relative to the pitch reference lines.

In view of the foregoing it is believed that the operation of my improved attitude indicating instrument will now be apparent. When the aircraft on which the instrument is mounted is flying at straight and level the nose of the miniature airplane 4 will be opposite the center point 0 of the background member 5 and the wings of the miniature airplane will appear to lie in coincidence with the horizon line 6. Also, for this condition the pointer 20 will be opposite the zero mark on the bank scale 21. If the aircraft banks, say to the right, the instrument case and the miniature airplane 4 will rotate clockwise about the roll axis DD an amount equal to the angle of bank. The background member 5, however, being stabilized by the gyroscope against rotation about the roll axis, will not rotate so that the wings of the miniature airplane appear to be banked to the right relative to the horizon line, giving the desired sense of indication. Similarly, if the aircraft banks to the left the instrument case and the miniature airplane will move counterclockwise relative to the horizon line 6 giving the desired left bank indication.

If the aircraft assumes a climbing attitude, the nose of the miniature airplane moves above the horizon line 6 due to the magnetic coupling action previously described. Similarly, if the aircraft dives, the nose of the miniature airplane will move below the horizon line 6, indicating the dive angle.

By way of example, the instrument is shown in Fig. 2 as it appears to the pilot for a condition of 15 degrees right bank and 30 degrees climb. It will be noted that the pilot can judge the approximate pitch and bank angles by observing the position of the miniature airplane relative to the horizon line 6. If he desires more exact information, he may read the bank angle by observing the position of the pointer 20 relative to the bank scale 21, and he may observe the pitch angle by reading the position of the nose of the miniature airplane relative to the pitch reference lines 7.

It will be apparent from the foregoing that I have provided a novel attitude indicating instrument which is simple in construction and relatively inexpensive to manufacture. It will be noted that the desired sense of indication of the miniature airplane is obtained without the use of any complicated motion reversing linkages or gearing which not only simplifies the manufacture but also eliminates friction which might otherwise cause error in the indication of the gyroscope. Furthermore, the use of a three-dimensional airplane rather than the customary two-dimensional one makes it much easier for the pilot to imagine that the miniature airplane represents his aircraft in space. If desired, the upper half of the inside surface of the concave background member 5 may be painted some color such as blue so that it gives the pilot the impression that he is observing the celestial sphere. By way of contrast, the lower half of the inner surface of the background member may be painted some darker color such as black or brown to represent the surface of the earth and to give high contrast at the horizon line.

While I prefer to use a gyroscope as a position-maintaining means for measuring the pitch and bank angles of the aircraft, it will be apparent to those skilled in the art that other forms of position-maintaining means may be used without departing from my invention. For example, a universally mounted pendulum may be used.

While I have shown and described particular embodiments of my invention, it will occur to those skilled in the art that various changes and modifications may be made without departing from my invention, and I therefore aim in the appended claims to cover all such changes and modifications as fall within the true spirit and scope of my invention.

What I claim as new and desire to secure by Letters Patent of the United States is:

1. An attitude indicating device for aircraft comprising a relatively fixed supporting structure, a gyro vertical mounted on said supporting structure so that it is free to pivot about a pitch axis extending in the direction of the pitch axis of an aircraft on which the device is to be mounted, a first permanent magnet mounted on said supporting structure so that it is free to pivot about an axis parallel to but spaced from said pitch axis, a second permanent magnet mounted on said gyro vertical for producing a magnetic field that is stabilized with reference to movement of said supporting structure about said pitch axis, said second permanent magnet being located so that the field produced thereby influences said first magnet and causes rotation thereof in response to a movement of said supporting structure about said pitch axis, and a pitch attitude indicator in the form of a three-dimensional miniature airplane connected to be rotated by said first magnet.

2. An attitude indicating device for aircraft comprising a supporting structure, position-maintaining means pivotally mounted on said supporting structure, a concave background member having on its inner surface an artificial horizon, a three-dimensional miniature airplane movably mounted on said supporting structure so that it projects into the space enclosed by said concave background member, and means for moving said miniature airplane relative to said background member in response to movement of said supporting structure relative to said position-maintaining means, said means comprising a pair of coacting magnets, one of said magnets being connected to said miniature airplane and the other of said magnets being connected to said position-maintaining means.

CHARLES F. SAVAGE.

REFERENCES CITED

The following references are of record in the file of this patent:

UNITED STATES PATENTS

| Number | Name | Date |
| --- | --- | --- |
| 2,207,414 | Rodanet | July 9, 1940 |
| 2,245,478 | Jann et al. | June 10, 1941 |